T. W. HELLIWELL.
GLAZING BAR FOR SKYLIGHTS.
No. 11,099. Reissued July 29, 1890.
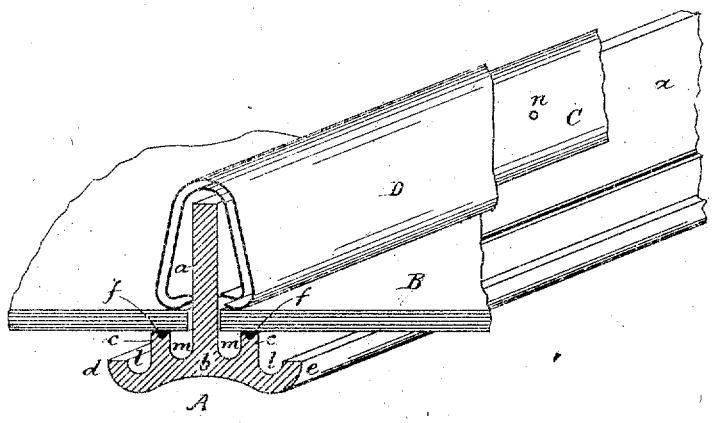
WITNESSES:
C. F. Bell
W. Allen
INVENTOR
Thomas W. Helliwell.
BY
Herbert W. T. Jenner.
ATTORNEY.

UNITED STATES PATENT OFFICE.

THOMAS WILLIAM HELLIWELL, OF BRIGHOUSE, ENGLAND.

GLAZING-BAR FOR SKYLIGHTS.

SPECIFICATION forming part of Reissued Letters Patent No. 11,099, dated July 29, 1890.

Original No. 412,750, dated October 15, 1889. Application for reissue filed June 5, 1890. Serial No. 354,404. Patented in England June 8, 1886, No. 7,666.

*To all whom it may concern:*

Be it known that I, THOMAS WILLIAM HELLIWELL, a subject of the Queen of Great Britain, residing in Brighouse, in the county of York, England, have invented certain new and useful Improvements in Glazed Roofs, of which the following is a specification.

This invention is the subject-matter of Letters Patent of Great Britain No. 7,666, dated June 8, 1886.

My invention has reference to the bar or astragal employed for supporting the lateral edges of the sheets of glass or other suitable material.

According to my present invention I construct the glazing-bar or astragal entirely of one piece of rolled metal, which combines in itself the central vertical rib or web by which the bar is stiffened against vertical strains, the flanges or ledges upon which the edges of the glass rest, and the channels or gutters beneath the glass for draining off the water of condensation and leakage. In rolling these metal bars I make the flanges on which the edges of the glass rest with two channels, whereby the condensed or other water is effectually caught and conveyed away. These channels and a shoulder are arranged side by side on each side of the central rib of the said astragal, such channels being divided by a rib upon which the glass rests. This dividing-rib is made to project sufficiently high to keep the glass clear of the top of the rib of the outer channels, which dividing-rib is formed with a groove for the purpose of receiving a suitable soft packing to lay the glass upon, so as to make the glazing more air-tight. Onto the central rib of the glazing-bar or astragal I fix certain saddles by rivets, solder, or other suitable means, such saddles being made either in short lengths or continuous, but so placed that their lower projecting flanges do not touch the glass, but are a suitable distance above, so as to allow the flanges of the cap to pass under them. I then take a suitably-shaped cap or cover having projecting flanges, which cap I slide in endwise or force into position by making the parts spring or yield to pressure, so that the flanges thereof pass under the flanges of the saddle, so that the said flanges rest and bear upon the glass in such manner as to keep the glass down and prevent it from moving.

In the accompanying drawing is shown a perspective view of my improved glazing-bars.

Referring to the drawing, the glazing-bar or astragal (shown at A) consists of a solid rolled metallic bar having a central vertical rib *a* and a horizontal flange *b*, which flange is made with two channels *l* and *m* on each side of the vertical rib *a*, as the drawing illustrates. The ledges or ribs *c* are made to project a little higher than the parts *d e*, for the purpose of supporting the glass or other material B clear of the said parts *d* and *e*. Onto the central rib *a*, I place a saddle or certain short lengths of metal or other suitable material C, which are fastened to the said rib by rivets or bolts passing horizontally through the central rib, as shown at *n*, or by solder or other means. The bottom flange of this saddle does not touch the upper surface of the sheet of glass, but is clear of it, so as to allow the flanges of the cap D to pass under. The cap is applied by sliding it endwise over the saddles, or it may be forced onto the saddles by causing the cap to yield to pressure.

By the adoption of the double channel, as above described, the condensed or other water is more effectually caught and conveyed away than is possible with only one channel. The form of cap for the double purpose of covering the central rib and for holding the glass in position is well adapted for outside glazing, as it saves all outside painting.

The ledge *c* is formed with a groove to receive a little packing, as shown at *f*, for the glass to rest upon.

The glazing-bars are made out of solid metal, and are formed by passing them between the revolving grooved rolls in the same manner as railway-rails are manufactured.

The essential feature of glazing-bars constructed according to this invention is that the central rib *a* is vertical, and that the inner ledges *c*, the outer ledges *d* and *e* and the channels *l* and *m* are all arranged side by side in substantially the same horizontal plane and without overlapping each other, as clearly shown in the drawing. Otherwise the glazing-bars could not be formed to the desired shape by passing the hot metal between grooved rolls. These rolled solid metal glazing-bars can be made of much greater length in a single piece than glazing-bars made of drawn sheet metal, and no additional strengthening bars or supports are required under them, as the central vertical rib *a* makes them sufficiently strong and stiff. The central rib *a* need not project so high above the horizontal flange *b*, as shown in the drawing, and when not so high the section is more easily rolled. I do not confine myself to the use of the means for attaching the cap D which I have shown and described, as the cap may be secured to the bar in many ways, so as to hold the edges of the glass in position.

I claim as my invention—

1. A glazing-bar or astragal made of solid rolled metal and combining in a single piece a central rib or web *a*, laterally-extending flanges having inner ledges *c c*, grooved on their upper surfaces, so as to hold a yielding packing for supporting the glass, channels *m m* between the ledges *c c*, and the central rib or web *a*, outer ledges *d e*, the upper edges of which are below the plane of the glass, and channels *l l* between the said outer and inner ledges, substantially as set forth.

2. A rolled metal glazing-bar combining in a single solid piece a strengthening-web, flanges extending laterally upon each side of the said web and provided with inner and outer channels, inner ledges between the said channels for supporting the glass, and outer ledges, the upper edges of which are below the plane of the glass, all the said channels and ledges being arranged side by side without overlapping each other, substantially as and for the purpose set forth.

In witness whereof I have hereunto signed my name in the presence of two subscribing witnesses.

THOMAS WILLIAM HELLIWELL.

Witnesses:
LEWIS C. PLATT, JR.,
WILBUR VAN TASSEL.